US006438624B1

(12) United States Patent
Ku et al.

(10) Patent No.: US 6,438,624 B1
(45) Date of Patent: Aug. 20, 2002

(54) CONFIGURABLE I/O EXPANDER ADDRESSING FOR I/O DRAWERS IN A MULTI-DRAWER RACK SERVER SYSTEM

(75) Inventors: Yi-Ming Ku, Austin; Wallace Tuten, Georgetown, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,083

(22) Filed: Mar. 30, 1999

(51) Int. Cl.$^7$ .......................... G06F 13/14; G06F 13/20
(52) U.S. Cl. .............. 710/9; 710/36; 710/38; 710/100; 710/107
(58) Field of Search ................... 710/9, 36, 38, 710/100, 107

(56) References Cited

U.S. PATENT DOCUMENTS 5,623,610 A * 4/1997 Knoll et al. ................ 395/281
5,664,221 A * 9/1997 Amberg et al. ............. 395/829
5,805,927 A * 9/1998 Bowes et al. ............... 395/843
5,926,648 A * 7/1999 Ayzenberg ................. 395/823

* cited by examiner

Primary Examiner—Jeffrey Gaffin
Assistant Examiner—Rehana Perveen
(74) Attorney, Agent, or Firm—Andrew Dillon

(57) ABSTRACT

A method of configuring a data communications system, by changing a default communications address of a logic component to a first assigned address, and connecting the logic component to a communications bus automatically in response to the address change. The logic component may include a multiplexer having an input connected to a first communications bus, and several outputs, some of the outputs being connected to input/output (I/O) devices, and at least one of the outputs being connected to a second communications bus. The latter output is disabled when the logic component has the default communications address; the logic component is connected to the second communications bus by enabling the output of the multiplexer. The invention is particularly adapted for use with a computer system, wherein a service processor having an I$^2$C port is connected to the first communications bus, and the service processor communicates with the logic component using an I$^2$C bus protocol to send data across the first communications bus to an input/output expander of the second logic component.

19 Claims, 2 Drawing Sheets

CONFIGURABLE I/O EXPANDER ADDRESSING FOR I/O DRAWERS IN A MULTI-DRAWER RACK SERVER SYSTEM

BACKGROUND OF THE INVENTION

1. Field of the Invention

The present invention generally relates to electronic data communications and integrated circuits (ICs), and more particularly to a method of configuring input/output (I/O) expander addresses on a communications bus, to facilitate inter-IC communications among a plurality of I/O planars used in a computer system.

2. Description of Related Art

Modern electronic circuits use many different types of logic components (e.g., processing units and microcontrollers) to carry out numerous functions. These circuits require a multitude of conductive pathways, or buses, to provide communications or connectivity between the logic components. A communications bus (transmission line) may be used to transmit certain values, such as data (operands) which are input to a logic component, or instructions used by the logic components, and further may be used to transmit various control signals. Buses can be unidirectional, bidirectional, or broadcast (used to interconnect three or more devices and allow simultaneous or sequential access to information or controls conveyed on the bus). These buses may be external, e.g., laid out on a printed circuit board, and interconnecting two or more devices which are separately packaged. They may also be internal, interconnecting two or more devices which are fabricated in a single package, such as an integrated circuit (IC).

Buses are used to interconnect devices for a wide variety of applications, including communications between complex computer components such as microprocessors, application specific integrated circuits (ASICs), peripheral devices, random-access memory, etc. Several different external bus designs have been developed for interconnecting various computer components. Early designs include the "expansion" bus referred to as the XT bus, and the later AT bus, also referred to as the Industry Standard Architecture (ISA) bus. A 32-bit extension to this bus was later created, which is referred to as the Extended Industry Standard Architecture (EISA). Another well-known external bus design is the Peripheral Component Interconnect (PCI) bus.

FIG. 1 illustrates a conventional computer system 10 using some of the foregoing buses. Computer system 10 has several processing units (CPUs) 12a, 12b, and 12c which are connected, via a system bus 14, to a system memory device 16 (random-access memory or RAM) that is used by the processing units to carry out program instructions, and firmware 18 whose primary purpose is to seek out and load an operating system from a peripheral device (usually the permanent memory device or hard disk) whenever the computer is first turned on. The processing units are connected to various peripheral devices via a PCI host bridge 20. These peripheral devices comprise PCI devices 22 and 24 connected to the PCI bus 26, and an ISA device 28 connected to an ISA bus 30 which is connected to an ISA bridge 32. These input/output (I/O) devices may include, for example, a display monitor, keyboard, graphical pointer device (mouse), a permanent storage device (direct access storage device or DASD), etc.

Another widely recognized bus design used for microelectronics is known as the $I^2C$ bus. The term "$I^2C$" is an abbreviation for "inter-IC," referring to communications between two or more integrated circuits. The bus physically consists of two active wires and a ground connection. The active wires (data and clock) are both bidirectional. An exemplary configuration using an $I^2C$ bus is shown in FIG. 2. Two microcontrollers 34 and 36 are connected to the clock and data lines, along with various other circuits such as a liquid crystal display (LCD) driver 38, a memory unit 40, and a data converter 42.

The $I^2C$ protocol supports multiple "masters," meaning that multiple chips can be interconnected to the same bus and each one can act as a master. The IC that initiates a given data transfer on the bus is considered the bus master. For that data transfer, all the other devices are regarded as "slaves." Every component connected to the bus has its own unique address, which is used to indicate a target for data. Each of these chips can act as a receiver or transmitter depending on its intended functionality.

The $I^2C$ bus design is used in many microcontroller-based applications for control, diagnostics or power management, and is especially useful in video devices such as computer monitors, televisions and VCRs. This design was originally created to provide an easy way to connect a CPU to peripheral chips in a television set, and is still commonly used to connect computer systems to peripheral devices. For example, some versions of the PowerPC™ processor sold by International Business Machines Corp. (IBM—assignee of the present invention) are provided with an $I^2C$ port to offer an alternative communications path for selected peripherals. IBM's Netfinity™ rack server system uses such a service processor to allow $I^2C$ communications with I/O subsystems. The service processor communicates with all I/O planars using the $I^2C$ bus to access information like vital product data (VPD) codes, planar voltages, temperatures, etc. The I/O planars are located in the rack on a base I/O drawer and one or more expansion I/O drawers.

I/O planars can use an I/O expander to select one of several $I^2C$ channels of the I/O subsystem. One example is the PCF8574 remote 8-bit I/O expander. The PCF8574 is a complementary metal-oxide semiconducting (CMOS) circuit that provides general purpose remote I/O expansion for most microcontroller families via an $I^2C$ bus. The device has an interrupt line which can be directly connected to the interrupt logic of a microcontroller. By sending an interrupt signal on this line, the remote I/O planar can inform the microcontroller if there is incoming data on its ports without having to communicate via the $I^2C$ bus, so the PCF8574 can remain a simple slave device.

One problem that has arisen in such uses of $I^2C$ systems, is the limitation imposed by the addressing scheme required as part of the $I^2C$ protocol. All I/O planars (in both the base I/O drawer and expansion I/O drawer) have the same $I^2C$ design, meaning that the I/O expander of each planar will have the same address when the system is first powered on. Accordingly, it is necessary to configure the $I^2C$ I/O expander addresses of all I/O planars, to different addresses. In the prior art, this configuration is performed manually, such as by using jumpers to interconnect address pins on the expanders, or using cables attached to the drawer frame providing an individual address. These approaches, requiring human involvement, easily result in errors, and require additional hardware. It would, therefore, be desirable to devise an improved method of addressing $I^2C$ components that allows a large number of devices to be easily interconnected to the $I^2C$ bus. It would be further advantageous if the method automatically provided appropriate addressing without requiring extra hardware.

SUMMARY OF THE INVENTION

It is therefore one object of the present invention to provide improved communications between logic components such as processors, microcontrollers and input/output (I/O) devices.

It is another object of the present invention to provide a method for achieving such improved communications which is applicable to an I²C bus and devices such as an I/O expander.

It is yet another object of the present invention to provide an improved method of addressing logical devices which are interconnected using a communications bus.

The foregoing objects are achieved in a method of configuring a data communications system, generally comprising the steps of connecting a first logic component to a first communications bus, connecting a second logic component to the first communications bus wherein the second logic component has a default communications address, connecting a third logic component to a second communications bus, changing the default communications address of the second logic component to a first assigned address, and connecting the second logic component to the second communications bus in response to the changing step. The second logic component may include a multiplexer having an input connected to the first communications bus, and a plurality of outputs, a first one of the outputs being connected to an input/output device, and a second one of the outputs being connected to the second communications bus, the second output being disabled when the second logic component has the default communications address; the second logic component is connected to the second communications bus by enabling the second output of the multiplexer. The address can be changed by having the first logic component write the first assigned address to the second logic component. In the embodiment wherein the third logic component has a default communications address which is the same as the default communications address of the second logic component, the invention may comprise the further steps of connecting a fourth logic component to a third communications bus, changing the default communications address of the third logic component to a second assigned address, after the connecting of the second logic component to the second communications bus, and then connecting the third logic component to the third communications bus in response to the changing of the default communications address of the third logic component to the second assigned address.

The first logic component can communicate with the second and third logic components using an I²C bus protocol to send data across the first and second communications buses. The invention is particularly adapted for use with a computer system, wherein the first logic component is a service processor of the computer system, the service processor having an I²C port connected to the first communications bus, and one or more peripheral devices are also connected to the service processor using an alternate communications path, e.g., a system bus. The service processor communicates with the second logic component using an I²C bus protocol to send data across the first communications bus to an input/output expander of the second logic component. The input/output expander has a plurality of ports, all of which can initially be set as input ports.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
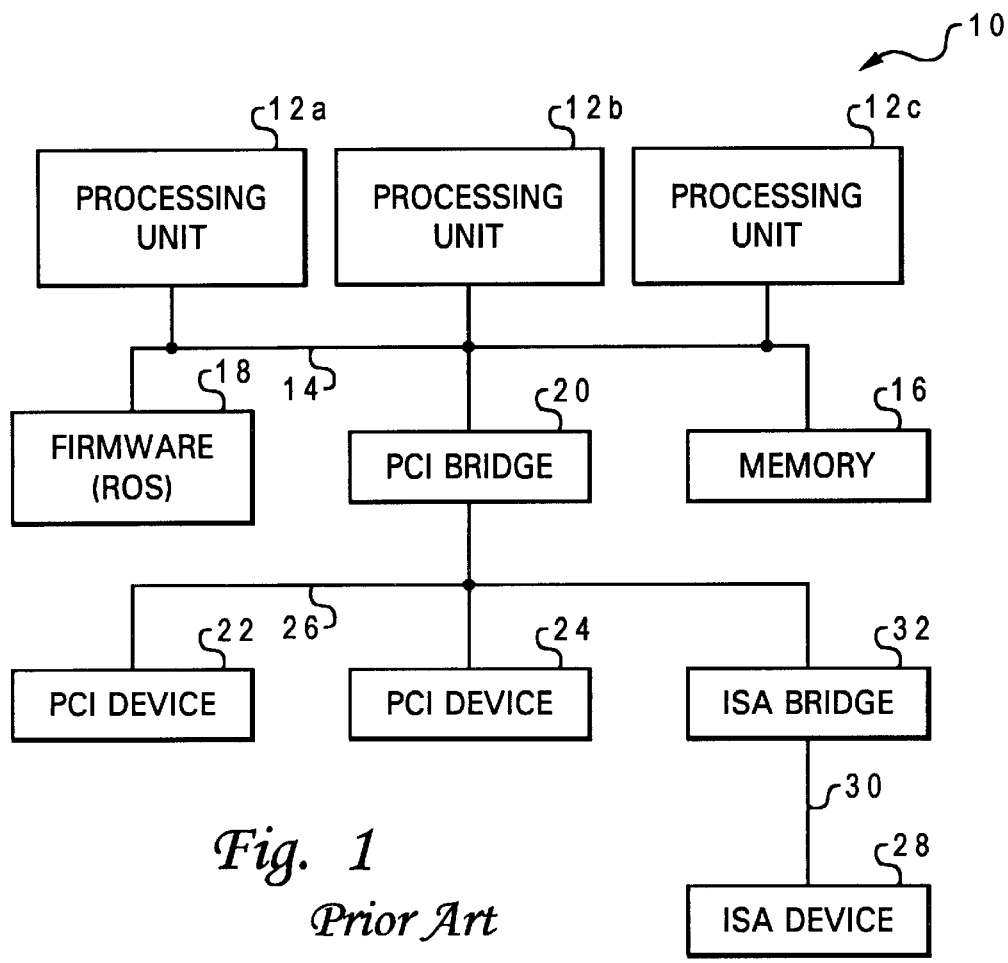
FIG. 1 is a block diagram of a conventional computer system having several communications buses, including a system bus, and peripheral component interconnect bus, and an expansion bus.
Figure 2:
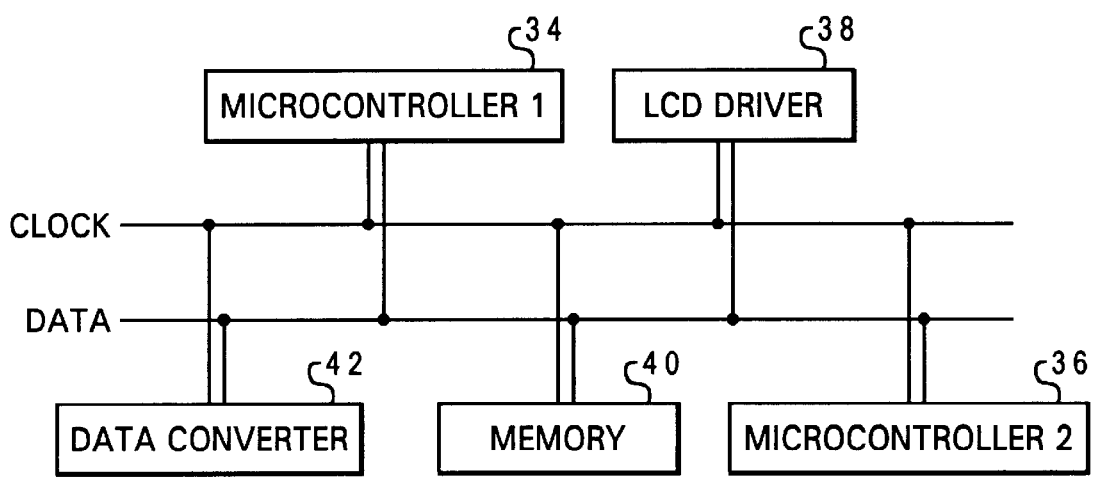
FIG. 2 is a block diagram of a prior art interintegrated circuit (I²C) communications bus used to interconnect various logical devices.
Figure 3:
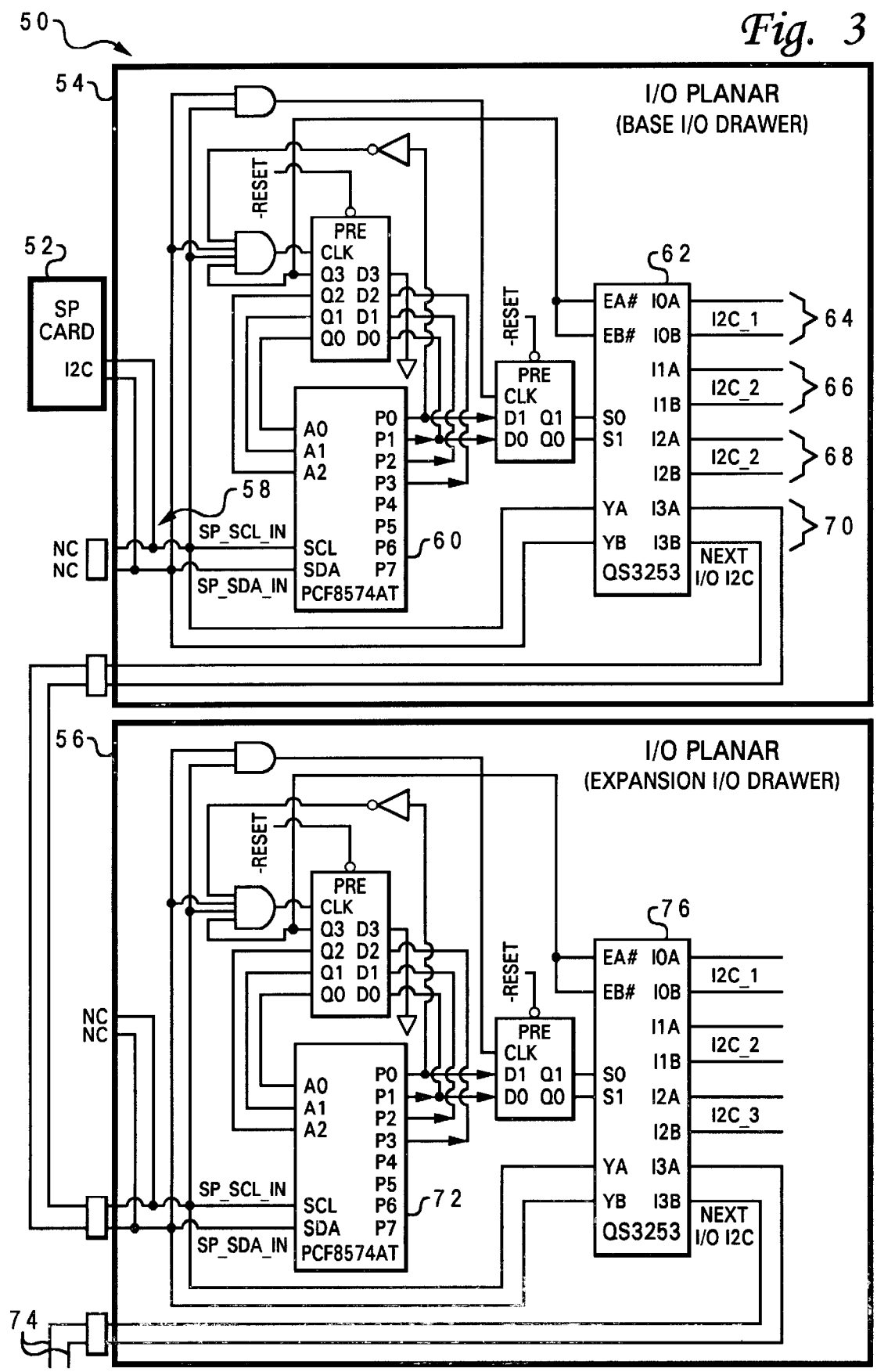
FIG. 3 is a schematic diagram of a portion of a data processing system constructed in accordance with the present invention, having a service processor communicating with a plurality of input/output expanders using I²C buses.

With reference now to the figures, and in particular with reference to FIG. 3, there is depicted one embodiment 50 of an input/output (I/O) subsystem for a data processing system, constructed in accordance with the present invention. The depicted embodiment is adapted for use in a rack computer system, such as a high-end server system, but the invention is not limited to such systems. I/O subsystem 50 is generally comprised of a service processor 52 and a plurality of I/O planars, including a first I/O planar 54 in a base I/O drawer, and a second I/O planar 56 in an expansion I/O drawer. Although only two I/O planars are shown, additional expansion drawers may be provided to add even more I/O planars, as further discussed below.

Service processor 52 may be a PowerPC™ processor having an I²C port providing a communications path for I/O devices such as modems, LAN adapters, permanent storage devices, televisions, etc. The data processing system may have multiple processors, and more than one processor can be provided with an I²C port, i.e., the data processing system can have multiple I/O subsystems. Other conventional computer components can be provided for the data processing system via communications buses (not shown), such as a peripheral component interconnect (PCI) bus.

Service processor 52 communicates with the I/O planars using I²C buses, including a first I²C bus 58 connected to an I/O expander 60 (such as the PCF8574AT remote 8-bit I/O expander) of I/O planar 54. I/O expander 60 is further connected to a logic circuit 62 (Quality Semiconductor's QS3253 chip) which acts as a 4:1 FET switch multiplexer/demultiplexer. The address of I/O expander 60 can be set to 42 through 4E hexadecimal (even addresses only), determined by its address pins A2, A1 and A0. I/O expander 60 converts the I²C serial data sent from service processor 52 to 8-bit output port data.

In this embodiment, port bits P3, P2 and P1 are connected, respectively, to three D-latch pins D2, D1 and D0. These latches are used to store the signals of A2, A1 and A0. The fourth D-latch, D3, is used to allow the address bits to be latched only once after reset. Signals are latched when I²C bus 58 is in the stop phase to prevent the data output from interfering with the current I²C operation. This design allows service processor 52 to write new I/O planar address bits only once until the next reset. Multiplexer/demultiplexer 62 uses pins S0 and S1 (also latched at the I²C stop phase) to select one of the four output I²C buses 64, 66, 68, and 70 to connect to the input I²C bus 58. The EA# and EB# pins of logic circuit 62, when low, enable the connections of signal group A and signal group B, respectively. The top three output I²C buses 64, 66 and 68 can be used to access I²C devices related to the base I/O drawer. The fourth I²C bus 70 is connected to the input of the next I/O planar 56, that is, to another I/O expander 72 on I/O planar 56.

I/O planar 56 has the same general design as I/O planar 54, and is able to connect to a further I²C bus 74 via another multiplexer/demultiplexer 76. This embodiment can thus support up to seven I/O planars with respective hex addresses of 42, 44, 46, 48, 4A, 4C and 4E (address 4D is reserved for use with the first logic component, i.e., service processor 52). After reset (e.g., power-on reset), all D-latch outputs are set active/high (1's), so the addresses of all of the I/O expanders (including I/O expanders 60 and 72) are initialized to 4E. The EA# and EB# pins of each QS3253 chip are also set active/high so, initially, no output I²C signals are connected to the input I²C signals. The following software procedure is used to set the appropriate addresses.

After I/O subsystem 50 is powered on, all I/O expander ports are set to input ports using internal pullups. The base I/O drawer I²C address, as noted above, is initially 4E. The outputs of multiplexer/demultiplexer 62 are disabled (using tri-state logic), so service processor I²C bus 58 cannot yet reach the other drawers. Service processor 52 then writes to address 4E with data "1111_0010" to change the base I/O drawer address to 42 and enable multiplexer/demultiplexer 62 to connect to the first expansion I/O drawer (I/O planar 56). Immediately thereafter, the base I/O drawer has the I²C address of 42, while the first expansion I/O drawer has the I²C address of 4E. I²C bus signals to any additional expansion I/O drawers are still disconnected. Service processor 52 then writes again to address 4E, but this time with data "1111_0100" to assign I²C address 44 to the first expansion I/O drawer, and enable multiplexer/demultiplexer 76 to connect to the I²C bus for the next expansion I/O drawer. These steps are repeated with different data being sent by service processor 52 to I²C address 4E, until each of the remaining expansion I/O drawer addresses are configured to the other available values. The present invention thus configures the new I²C addresses automatically, and without any extra hardware or manual intervention.

In addition to the reset signal that is generated on power-up, the I/O planars can also be made responsive to a reset signal generated by service processor 52. In this manner, the service processor can dynamically reconfigure the I/O subsystem, such as when a new I/O planar is added in another expansion I/O drawer.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of configuring a data communications system, comprising the steps of:
    connecting a first logic component to a first communications bus;
    connecting a second logic component to the first communications bus, the second logic component having a default communications address;
    connecting a third logic component to a second communications bus;
    changing the default communications address of the second logic component to a first assigned address; and
    connecting the second logic component to the second communications bus in response to said changing step.

2. The method of claim 1 wherein:
    the second logic component includes a multiplexer having an input connected to the first communications bus, and a plurality of outputs, a first one of the outputs being connected to an input/output device, and a second one of the outputs being connected to the second communications bus, the second output being disabled when the second logic component has the default communications address; and
    said step of connecting the second logic component to the second communications bus includes the step of enabling the second output of the multiplexer.

3. The method of claim 1 wherein said changing step includes the step of the first logic component writing the first assigned address to the second logic component.

4. The method of claim 1 wherein the third logic component has a default communications address which is the same as the default communications address of the second logic component, and further comprising the steps of:
    connecting a fourth logic component to a third communications bus;
    changing the default communications address of the third logic component to a second assigned address, after said step of connecting the second logic component to the second communications bus; and
    connecting the third logic component to the third communications bus in response to said step of changing the default communications address of the third logic component to the second assigned address.

5. The method of claim 1 comprising the further step of the first logic component communicating with the second and third logic components using an I²C bus protocol to send data across the first and second communications buses.

6. The method of claim 1 wherein the first logic component is a service processor of a computer system, the service processor having an I²C port connected to the first communications bus, and further comprising the step of connecting the service processor to one or more peripheral devices using a system bus.

7. The method of claim 6 wherein the service processor communicates with the second logic component using an I²C bus protocol to send data across the first communications bus to an input/output expander of the second logic component.

8. The method of claim 7 wherein the input/output expander has a plurality of ports, and further comprising the step of setting all of the ports to input ports.

9. A device comprising:
    a first communications bus;
    a first logic component connected to said first communications bus;
    a second logic component having a default communications address, connected to said first communications bus;
    a second communications bus;
    a third logic component connected to said second communications bus;
    means for changing the default communications address of said second logic component to a first assigned address; and
    means for connecting said second logic component to said second communications bus in response to said changing means.

10. The device of claim 9 wherein:

said second logic component includes a multiplexer having an input connected to said first communications bus, and a plurality of outputs, a first one of said outputs being connected to an input/output device, and a second one of said outputs being connected to said second communications bus, said second output being disabled when said second logic component has the default communications address; and said connecting means enables said second output of said multiplexer when said second logic component has the first assigned address.

11. The device of claim 9 wherein said changing means writes the first assigned address to the second logic component.

12. The device of claim 9 wherein said second logic component is initialized with the default communications address in response to a reset signal generated by said first logic component.

13. The device of claim 9 wherein said third logic component has a default communications address which is the same as the default communications address of said second logic component, and further comprising:

a third communications bus;

a fourth logic component connected to the third communications bus;

second means for changing the default communications address of said third logic component to a second assigned address; and means for connecting said third logic component to said third communications bus in response to said second changing means.

14. The device of claim 9 wherein said input/output expander has a plurality of ports, and further comprising means for setting all of said ports to input ports upon powering up of said input/output expander.

15. The device of claim 9 wherein said first and second communications buses are $I^2C$ buses.

16. The device of claim 15 wherein said first logic component is a service processor of a computer system, said service processor having an $I^2C$ port connected to said first communications bus, and further comprising one or more peripheral devices connected to said service processor using a system bus.

17. The device of claim 16 wherein said service processor communicates with said second logic component using an $I^2C$ bus protocol to send data across said first communications bus to an input/output expander of said second logic component.

18. An input/output (I/O) subsystem for a data processing system, comprised of:

a service processor;

a plurality of input/output (I/O) planars, including a first I/O planar and a second I/O planar, said first and second I/O planars being assigned a common default communications address upon power up;

a first $I^2C$ bus connecting said service processor to said first I/O planar;

a second $I^2C$ bus connecting said first I/O planar to said second I/O planar;

means for disabling said second $I^2C$ bus when said first I/O planar has the default communications address, and enabling said second $I^2C$ bus when said first I/O planar is assigned a different address.

19. The input/output (I/O) subsystem of claim 18 wherein said first I/O planar is mounted in a base I/O drawer, and said second I/O planar is mounted in an expansion I/O drawer.

* * * * *